(12) United States Patent
Guerci et al.

(10) Patent No.: US 11,256,988 B1
(45) Date of Patent: Feb. 22, 2022

(54) PROCESS AND METHOD FOR REAL-TIME SENSOR NEUROMORPHIC PROCESSING

(71) Applicants: Joseph R. Guerci, La Jolla, CA (US); Jameson Bergin, Glastonbury, CT (US); Brian Watson, Gainesville, FL (US); Sandeep Gogineni, Centefville, OH (US); Colton Smith, Chillocothe, OH (US); Gavin McGee, Delaware, OH (US)

(72) Inventors: Joseph R. Guerci, La Jolla, CA (US); Jameson Bergin, Glastonbury, CT (US); Brian Watson, Gainesville, FL (US); Sandeep Gogineni, Centefville, OH (US); Colton Smith, Chillocothe, OH (US); Gavin McGee, Delaware, OH (US)

(73) Assignee: Information Systems Laboratories, Inc., San Diego, CA (US)

( * ) Notice: Subject to any disclaimer, the term of this patent is extended or adjusted under 35 U.S.C. 154(b) by 0 days.

(21) Appl. No.: 17/379,245

(22) Filed: Jul. 19, 2021

(51) Int. Cl.
*G06N 3/08* (2006.01)
*G06N 3/063* (2006.01)
*G06N 3/04* (2006.01)

(52) U.S. Cl.
CPC ............... *G06N 3/08* (2013.01); *G06N 3/049* (2013.01); *G06N 3/063* (2013.01)

(58) Field of Classification Search
CPC ........... G06N 3/08; G06N 3/049; G06N 3/063
See application file for complete search history.

(56) References Cited

U.S. PATENT DOCUMENTS

| | | | |
|---|---|---|---|
| 10,948,566 B1* | 3/2021 | Harbin | G01S 5/0289 |
| 2018/0247192 A1* | 8/2018 | Fick | G06N 3/063 |
| 2019/0038148 A1* | 2/2019 | Valys | A61B 5/7267 |
| 2019/0076031 A1* | 3/2019 | Valys | A61B 5/361 |
| 2019/0104951 A1* | 4/2019 | Valys | G16Z 99/00 |
| 2020/0334452 A1* | 10/2020 | Gurbuz | G06K 9/6289 |
| 2021/0034962 A1* | 2/2021 | Cherubini | G06N 3/08 |
| 2021/0156957 A1* | 5/2021 | Gillian | G01S 7/354 |
| 2021/0293927 A1* | 9/2021 | Tyagi | G01S 7/412 |

OTHER PUBLICATIONS

Asghar et al., "A Low-Power Spiking Neural Network Chip Based on a Compact LIF Neuron and Binary Exponential Charge Injector Synapse Circuits", Jun. 29, 2021, pp. 1-17 (Year: 2021).*

(Continued)

*Primary Examiner* — Paulinho E Smith
(74) *Attorney, Agent, or Firm* — Law Firm of Stuart S. Levy

(57) ABSTRACT

A novel system and method are described that allows for implementation of compact and efficient deep learning AI solutions to advanced sensor signal processing functions. The process includes the following stages: (1) A method for generating requisite annotated training data in sufficient quantity to ensure convergence of a deep learning neural network (DNN); (2) A method for implementing the resulting DNN onto a Spiking Neural Network (SNN) architecture amenable to efficient neuromorphic integrated circuit (IC) architectures; (3) A method for implementing the solution onto a neuromorphic IC; and (4) A statistical method for ensuring reliable performance.

13 Claims, 2 Drawing Sheets

(56) References Cited

OTHER PUBLICATIONS

RFnest, "RFnest User Manual", www.i-a-i.com/rfnest, 2015, pp. 1-73 (Year: 2015).*

RFnest, "Rfnest The Real Word in a Box", 2017, pp. 1-4 (URL: https://www.i-a-i.com/wp-content/uploads/2017/07/RFnest-Specsheet-2017.pdf) (Year: 2017).*

Davies et al., "Advancing Neuromorphic Computing with Loihi: A Survey or Results and Outlook", May 2021, Proceedings of IEEE, vol. 109 No. 5, pp. 911-934. (Year: 2021).*

M. R. Minar and J. Naher, "Recent advances in deep teaming: An overview," published by arXiv preprint arXiv:1807.08169 2018.

S. Balaban, "Deep learning and face recognition the state of the art," in Biometric and Surveillance Technology for Human and Activity Identification XII, 2015, vol. 9457: International Society for Optics and Photonics, p. 94570B.

A. Tavanaei, M. Ghodrati, S. R. Kheradpisheh, T. Masquelier, and A. Maida, "Deep learning in spiking neural networks," Neural Networks, vol. 111, pp. 47-63, 2019.

D. J. Soemers, V. Melia, C. Browne, and O. Teytaud, "Deep learning for general game playing with ludii and polygames," arXiv preprint arXiv:2101.09562, 2021.

Davies et al., "Advancing neuromorphic computing with Loihi: A survey of results and outlook," Proceedings of the IEEE, vol. 109, No. 5, pp. 911-934, 2021.

* cited by examiner

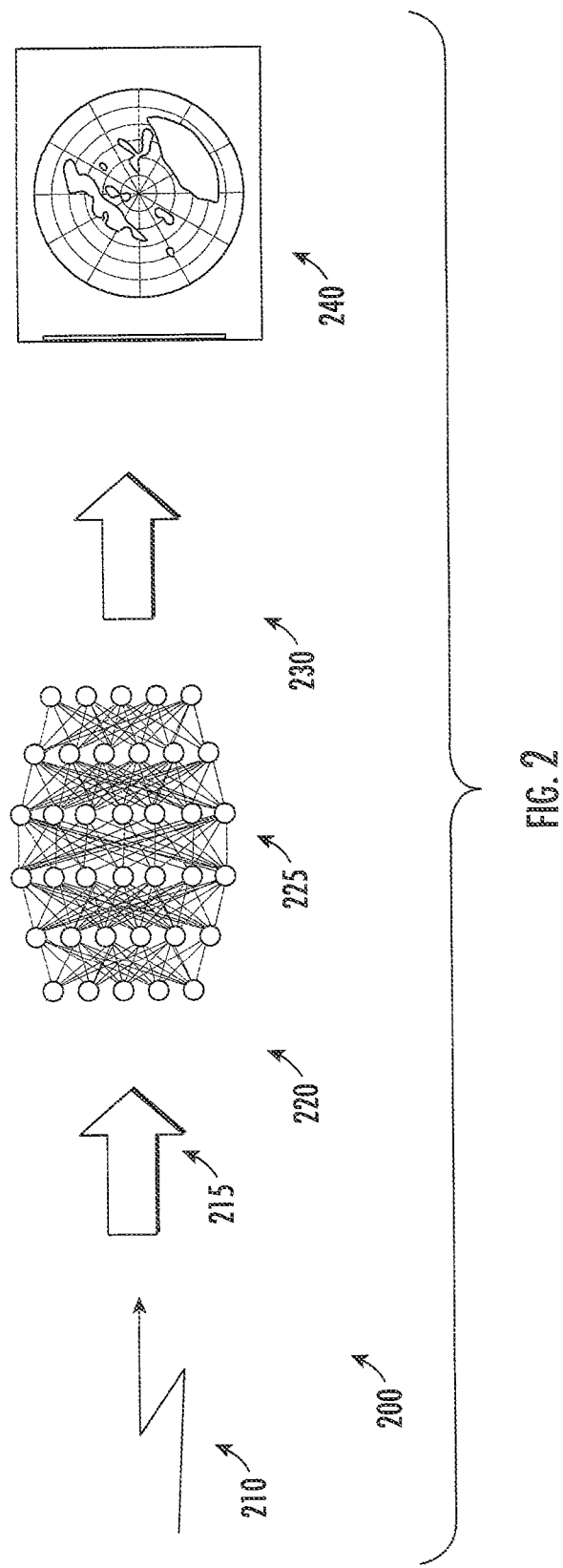

PROCESS AND METHOD FOR REAL-TIME SENSOR NEUROMORPHIC PROCESSING

CROSS-REFERENCE TO RELATED APPLICATIONS

None

FEDERALLY SPONSORED RESEARCH OF ISL

None

BACKGROUND

Field of the Invention

The invention relates to the general field of deep learning neural networks, which has enjoyed a great deal of success in recent years. This is attributed to more advanced neural architectures that more closely resemble the human brain. Neural networks work with functionalities similar to the human brain. The invention includes both a training cycle and a live (online) operation. The training cycle includes five elements and comprises the build portion of the deep learning process. The training cycle requirements ensure adequate convergence and performance. The live (online) operation includes the live operation of a Spiking Neural Network (SNN) designed by the five steps of the training cycle. The invention is part of a new generation of neuromorphic computing architectures, including Integrated Circuits (IC). This new generation of neuromorphic computing architectures includes IC, deep learning and machine learning.

Description of the Related Art

There has been significant success in a few specialized areas, including deep learning, which is discussed in the paper by M. R. Minar and J. Naher, "Recent advances in deep learning: An overview," published by arXiv preprint arXiv:1807.08169 2018. Deep learning has over the years advanced in the area of facial recognition; discussed in the paper by S. Balaban, "Deep learning and face recognition: the state of the art," in *Biometric and Surveillance Technology for Human and Activity Identification XII,* 2015, vol. 9457: International Society for Optics and Photonics, p. 94570B. There has also been significant success related to machine learning in game playing; as discussed in the paper by D. J. Soemers, V. Mella, C. Browne, and O. Teytaud, entitled "Deep learning for general game playing with ludii and polygames," published inarXiv preprintarXiv: 2101.09562, 2021.

The general application of deep learning is impeded by the following implementation issues.

(1) The requirement for extensive annotated and high-quality training data and/or training environment.

(2) Subject matter expertise in presenting said training data/environment to an appropriately selected deep learning network.

(3) For real-time applications, the requirement to implement includes the deep learning network on a spiking neural network (SNN) architecture; see the paper by A. Tavanaei, M. Ghodrati, S. R. Kheradpisheh, T. Masquelier, and A. Maida, "Deep learning in spiking neural networks," *Neural Networks,* vol. 111, pp. 47-63, 2019; that is amenable to a more efficient real-time implementation.

(4) with respect to porting of SNN neural "weights" to an appropriate neuromorphic computer and/or integrated circuit (IC); see the paper by S. Greengard, "Neuromorphic chips take shape," published in *Communications of the ACM,* vol. 63, no. 8, pp. 9-11, 2020; and (5) Statistical reliability testing and evaluation (T&E) of final instantiation (e.g., neuromorphic chip) for final acceptance and certification. This last step also entails the use of extensive training data and/or environment to achieve requisite statistical reliability. The invention described below addresses all of the above steps in a novel, integrated fashion.

SUMMARY OF THE INVENTION

The system and method of the invention, as described herein addresses all of the above steps in a novel, integrated fashion. A novel and non-obvious system and method of the claimed invention are described herein. The novel and non-obvious process and method of the invention allows for implementation of compact and efficient deep learning AI solutions to advanced sensor signal processing functions. The process and method of the invention includes the following stages:

(1) a method for generating requisite annotated training data in sufficient quantity to ensure convergence of a DNN;

(2) a method for implementing which converts the resulting DNN onto an SNN architecture which is amenable to efficient neuromorphic (IC) architectures;

(3) a method for implementing the solution onto a neuromorphic IC; and (4) a statistical method for ensuring reliable performance.

The invention includes both a "Training cycle" as well as a "Live Operation." The sequence begins with a sensor application being selected, with associated performance specifications. The sensor could be a radar, sonar, lidar, etc. A high-fidelity (hi-fi) sensor model can be used to generate the requisite training data and/or training environment. The sensor model (in this case RFView®) (https://RFView.ISLinc.com is used to generate training data in sufficient quantity to ensure convergence of the DNN neuron weights. Thereafter, a suitable DNN interface is established wherein the raw sensor training cycle data is preprocessed into a format suitable for presentation to a DNN. In this step of the method, the DNN is converted to an SNN. Discussion regarding the conversion from DNN to SNN is found in the paper by M. Davies et al., "Advancing neuromorphic Computing with Loihi: A survey of results and outlook," *Proceedings of the IEEE,* vol. 109, no. 5, pp. 911-934, 2021. The SSN is then implemented on a suitable neuromorphic architecture or IC to achieve requisite performance.

FIG. 2 illustrates the live (online) operation of the SNN designed in the above steps. Through a combination of the synthetic data/environment and live environmental data, the SNN is further tested to ensure reliable performance. The amount of testing is based on the desired level of reliability consistent with best practices from reliability theory. Further information related to the desired level of reliability can be found in the book by B. V. Gnedenko, Y. K. Belyayev, and A. D. Solovyev, "Mathematical methods of reliability theory," published in Academic Press, 2014

BRIEF DESCRIPTION OF THE DRAWINGS

FIG. 2 is directed to the live operation configuration, as well as for Testing and Evaluation (T&E) of the system.

DETAILED DESCRIPTION OF EXEMPLARY EMBODIMENTS OF THE INVENTION

Figure 1:
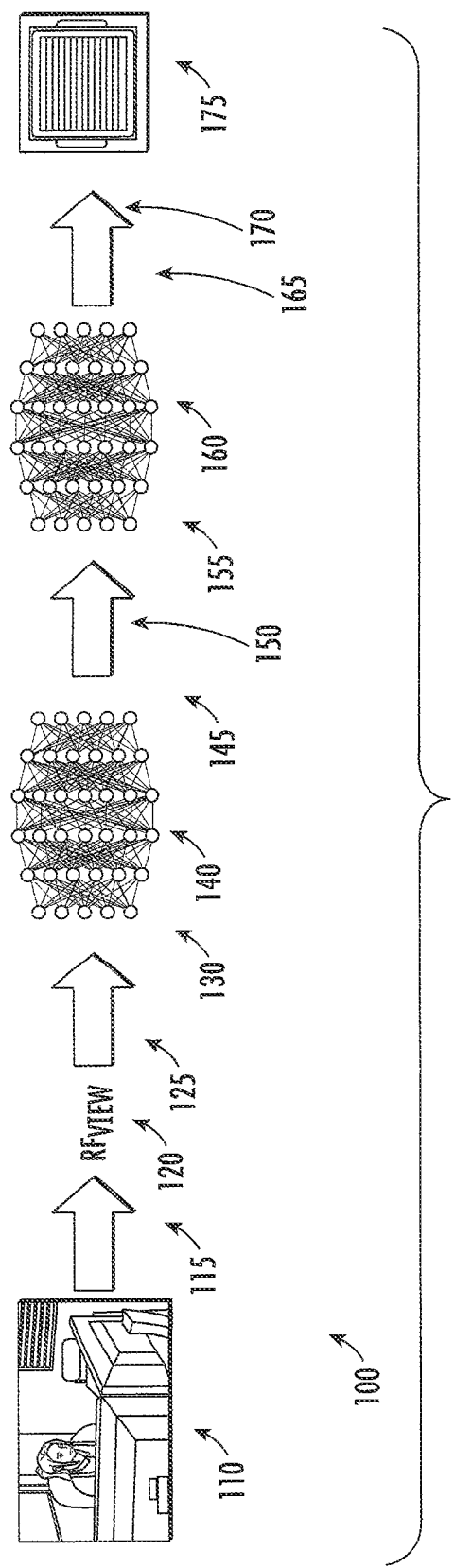
FIG. 1 is directed to the five elements of the "build" or "training cycle" portion of the deep learning process.

Beginning with the Training Cycle found in FIG. 1, this Figure explains the elements and creation of the "build" portion of the deep learning process. This process takes performance requirements as inputs, and outputs a DNN, implemented on a spiking neural network (SNN); which is amenable to implementation on a neuromorphic computing architecture, such as an SNN IC. The above process is delineated into the following sequence:

1. As illustrated in FIG. 1, the sequence begins the training cycle 100 with the generation of the scenario 110 to be used in the training cycle. As shown in element 115, a sensor application is selected, with associated performance specifications. The sensor application could be a radar, sonar, lidar, etc. The system designer then specifies the operating environment in sufficient detail such that a high-fidelity (hi-fi) sensor model can be used to generate the requisite training data and/or training environment. In FIG. 1, a hi-fi Radio-Frequency (RF) sensor model RFView® 120 is used for illustrative purposes. However, it should be understood that any suitable sensor model that faithfully recreates real-world operating characteristics will suffice. This model is used to augment whatever "real" (e.g., measured) data may or may not be available for training. In most sensor applications, it is often cost prohibitive to use only "measured" data for training. It is thus a key feature of this invention that a computer model surrogate is used instead of, or in addition to, a non-surrogate computer model.

2. The sensor model (in this case RFView®) 120 is used to generate training data in sufficient quantity to ensure convergence of the DNN neuron weights. Weight is the parameter within a neural network that transforms input data within the network's hidden layers. As an input enters the node, it gets multiplied by a weight value and the resulting output is either observed, or passed to the next layer in the neural network. For many applications of the invention, this could be many terabytes of data. Additionally, the sensor model can be used to create a "virtual reality" training environment in which the DNN learns through trial and error. Combinations of these two approaches are also possible.

3. Next, a suitable DNN interface, illustrated as 125, is established wherein the raw sensor training data is preprocessed into a format suitable for presentation to a DNN. This step requires experience and expertise on the designer's part in order to ensure proper convergence of the network. Multilayer diagnostics are often employed as the network evolves to provide Quality Assurance (QA). From the DNN interface 125, the sensor training data is forwarded to the DNN 140, via input 130. Subsequently, the training environment information is output from the DNN 140 to a DNN-to-SNN operation through a DNN-to-SNN conversion 150, via 145.

4. In this step, the DNN 140 is converted to an SNN 160 through SNN input 155. Alternatively, the intermediary DNN step can be eliminated in some circumstances, such that the SNN is trained directly from the output of the High Fidelity (hi-Fi) sensor model.

5. Lastly, the SNN 160 outputs the SNN information via SNN output 165 to IC 175, via the SNN-to-IC 170. Thus, the training cycle is implemented on a suitable neuromorphic architecture or IC to achieve requisite performance (speed, power consumption, etc.).

Turning next to the Live Operation of FIG. 2, this Figure describes the live operation configuration for both operations, as well as the Test and Evaluation (T & E) of the system and method of the invention.

FIG. 2 illustrates the live (online) operation of the SNN steps designed above. Through a combination of the synthetic data/environment and live environmental data, the SNN is further tested to ensure reliable performance. The amount of testing is based on the desired level of reliability consistent with best practices from reliability theory.

The Live Operation of FIG. 2 begins with the use of data feed from sensor 210. The data from sensor data feed 210 is delivered to SNN interface 215. From the SNN interface 215 the data is output, through input 220 to the SNN chip. After processing of the training data at the SNN chip 235, the processed data is output from the SNN chip to sensor application 240, by way of SNN chip output 230.

In addition to the above, additional features of the invention are as follows: The use of a high-fidelity (Hi-Fi), physics-based sensor model to generate either (1) The requisite training data; and/or (2) A virtual reality (VR) training environment. These two approaches can be combined and are not mutually exclusive. An example of such a model for radio frequency (RF) applications is RFView®.

The use of a sensor model can incorporate conventional 3D annotated digital terrain databases such as Digital Terrain Elevation Data (DTED), Land-Cover Land Use (LCLU), and other 3D environmental and object databases. Incorporation of the 3D scene provides automatic annotation of the training data that would not be possible using other sources of data (e.g., images annotated by inspection by humans).

A suitable method for interfacing the output from the sensor model, to the input of the DNN, is sometimes referred to as the "data pre-processing" stage. This step is critical to ensure a reasonable rate of convergence and performance of the DNN. As an example, for radar applications, it may be more efficient to present complex range-Doppler data to the DNN rather than raw sensor measurements (e.g., raw In-phase and Quadrature (I&Q)).

A suitable method for determining when adequate convergence and performance of the DNN is achieved. This is achieved via a combination of monitoring of the features present at each layer of the network, as well as the change in magnitude of the neuronal weights, as additional input data is added.

A method for converting a conventional convolutional neural network (CNN) to a SNN, the latter being a prerequisite for implementation on modern neuromorphic ICs.

A method for testing the final IC for requisite reliability (e.g., "Mil Spec). Here again the sensor model described above, in conjunction with any real measurement data if available and properly annotated, is used to generate a testing/QA environment to achieve a pre-specified level of reliability (e.g., 99% reliability).

Although exemplary embodiments with various alternatives have been disclosed herein, the invention is not limited thereto, as one of ordinary skill in the art would recognize other alternatives. Accordingly, the invention is only limited by the scope of the appended claims.

What is claimed is:

1. A method of providing real-time sensor neuromorphic processing, the method comprising the steps of:
   providing a training cycle and a live operation cycle;
   wherein the training cycle includes:

(1) the establishment of a build portion or training cycle of a deep learning process with AI;
wherein the build portion or training cycle begins with the process taking performance requirements in the form of generation of a scenario as inputs;
(2) selecting a sensor model application, with associated performance specifications set forth in the generation of a scenario;
(3) providing a Hi-Fi Radio-Frequency (RF) sensor model which is used to augment any real data for training;
(4) providing a computer model surrogate which is used instead of, or in addition to, a non-surrogate computer model;
(5) the sensor model application being one or more of radar, sonar or LIDAR;
(6) specifying an operating environment details wherein the Hi-Fi sensor model generates requisite training data and/or training environment;
(7) the Hi-Fi sensor model generates training data in a quantity to ensure convergence of DNN neuron weights, wherein as an input enters the node, the input gets multiplied by a weight value and the resulting output is either observed, or passed to the next layer in the neural network;
(8) raw sensor training data is preprocessed into a format suitable for presentation to a DNN from a DNN interface, the sensor model application training data is forwarded to the DNN;
(9) the training environment information is then output from the DNN to a DNN-to-SNN operation through a DNN-to-SNN conversion; and
(10) thereafter, the DNN is converted to an SNN and the SNN outputs the SNN information to an neuromorphic integrated circuit (IC), creating a neuromorphic sensor application;
(11) providing and utilizing a statistical method which ensures reliable performance of the neuromorphic integrated circuit, wherein reliability is 99%.

2. The method of claim 1, wherein the method further comprising the step of the sensor model application being capable of generating a Testing/QA environment.

3. The method of claim 1, the method further comprising the step of the training data being at least terabytes of data.

4. The method of claim 1, further comprising the step of the sensor model application creating a virtual reality training environment in which the DNN learns through trial and error.

5. The method of claim 1, further comprising the step of multilayer diagnostics employed to provide the QA.

6. The method of claim 1, further comprising the step of implementing the SNN on a neuromorphic architecture or integrated circuit (IC) achieves requisite performance with respect to speed and power consumption.

7. The method of claim 1, concluding the step of further testing the SNN to ensure reliable performance.

8. The method of claim 1, wherein the method further includes the step of the Hi-Fi sensor model being a physics-based sensor model at high-fidelity, which generates the requisite training data.

9. The method of claim 1, wherein the method further includes the step of the high-fidelity sensor model being a physics-based sensor model, which generates both the requisite training data and a virtual reality (VR) training environment.

10. The method of claim 1, wherein the method further includes the step of the sensor model incorporates 3D annotated digital terrain databases of Digital Terrain Elevation Data (DTED), Land-Cover Land Use (LCLU), and/other 3D environmental and object databases.

11. The method of claim 1, wherein the method further includes the step of interfacing the output from the sensor model application to the input of the DNN, as a data pre-processing stage which ensures a reasonable rate of convergence and performance of the DNN.

12. The method of claim 1, further comprising the step of monitoring changes in magnitude of neuronal weights as additional input data is added.

13. The method of claim 1, further including the step of presenting either complex range-Doppler data to the DNN or raw sensor measurements of In-phase and Quadrature (I&Q).

* * * * *